(12) United States Patent
Chang

(10) Patent No.: US 6,837,368 B1
(45) Date of Patent: Jan. 4, 2005

(54) COMPACT DISC CONTAINER

(76) Inventor: Hsi-Chien Chang, No. 9, 22nd Rd., Taichung Ind. Park, Taichung City (TW)

(*) Notice: Subject to any disclaimer, the term of this patent is extended or adjusted under 35 U.S.C. 154(b) by 0 days.

(21) Appl. No.: 10/640,798

(22) Filed: Aug. 15, 2003

(51) Int. Cl.$^7$ .............................................. B65D 69/00
(52) U.S. Cl. .................... 206/232; 206/308.1; 229/67.3
(58) Field of Search .............................. 206/232, 308.1, 206/307.1, 39, 449; 229/67.3, 67.4, 67.1; 281/45

(56) References Cited

U.S. PATENT DOCUMENTS

| | | | | |
|---|---|---|---|---|
| 2,729,258 A | * | 1/1956 | Pentland et al. ............. | 206/553 |
| 5,664,724 A | * | 9/1997 | Ho ............................. | 229/67.4 |
| 5,947,279 A | * | 9/1999 | Lee et al. ................... | 206/232 |
| 6,419,083 B1 | * | 7/2002 | Huang ........................ | 206/308.1 |
| 6,607,122 B1 | * | 8/2003 | Ong ........................... | 229/67.3 |
| 6,672,439 B2 | * | 1/2004 | Platte, III ................... | 190/103 |
| 6,758,336 B2 | * | 7/2004 | Kohana ...................... | 206/425 |

* cited by examiner

Primary Examiner—Shian T. Luong
(74) Attorney, Agent, or Firm—Harrison & Egbert

(57) ABSTRACT

A compact disc container comprises a shell body and a plurality of disc pockets disposed in a hollow interior of the shell body. The shell body is provided in a left side and a right side with accordion pleats. The disc pockets are formed of a nonwoven middle layer and two plastic film outer layers. The middle layer and the two outer layers are joined at adjoining left edges and right edges with an outer fusion line and an inner fusion line. Located between the outer fusion line and the inner fusion line of one of the two outer layer is a slit. The disc pockets are fastened with the left side and the right side of the shell body such manner that the slit is corresponding to a tip of the accordion pleats, and that the outer fusion line is joined with a face of the accordion pleats.

4 Claims, 12 Drawing Sheets

COMPACT DISC CONTAINER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to an expandable and portable container for keeping compact disc in an orderly manner.

BACKGROUND OF THE INVENTION

The conventional compact disk containers are generally made of a rigid or soft material. The rigid container has a bulky volume and cannot be easily stored or carried around. The soft container has a limited storage space which is not expandable and is devoid of means to facilitate the retrieving of the compact disc. The storage space of the soft container is provided with a plurality of disk holders, which can be flipped like pages in a book. Such disk holders are susceptible to damage or wear. Like the rigid container, the soft container cannot be conveniently carried around.

BRIEF SUMMARY OF THE INVENTION

The primary objective of the present invention is to provide a compact disc container which is free of the deficiencies of the prior art containers described above.

In keeping with the principle of the present invention, the foregoing objective of the present invention is attained by a compact disc container which is made of an expandable shell. The shell has a front side, a rear side, and two pleated sides fastened between the front side and the rear side. The shell has a hollow interior which is defined by the front side, the rear side, and the two pleated sides. The hollow interior is provided with a plurality of disc-holding bags, which are securely fastened in place by the pleated sides. The disc-holding bags are provided with a file tab attached thereto. The hollow interior of the shell is compressible and expandable by virtue of its accordion pleats.

The features and the advantages of the present invention will be more readily understood upon a thoughtful deliberation of the following detailed description of the preferred embodiments of the present invention with reference to the accompanying drawings.

DETAILED DESCRIPTION OF THE INVENTION

Figure 1:
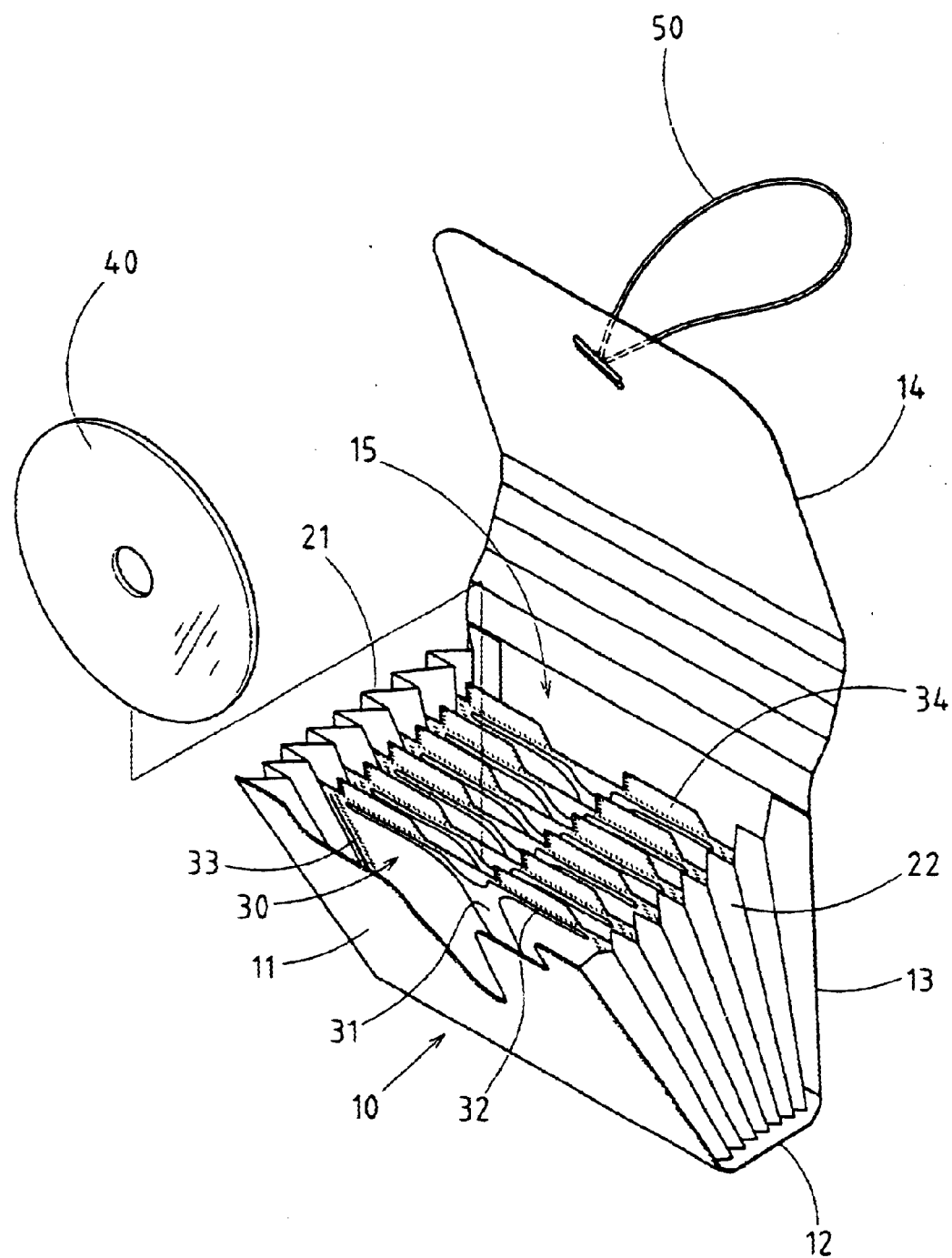
FIG. 1 shows a perspective view of a first preferred embodiment of the present invention with a flap being in the open state.
Figure 2:
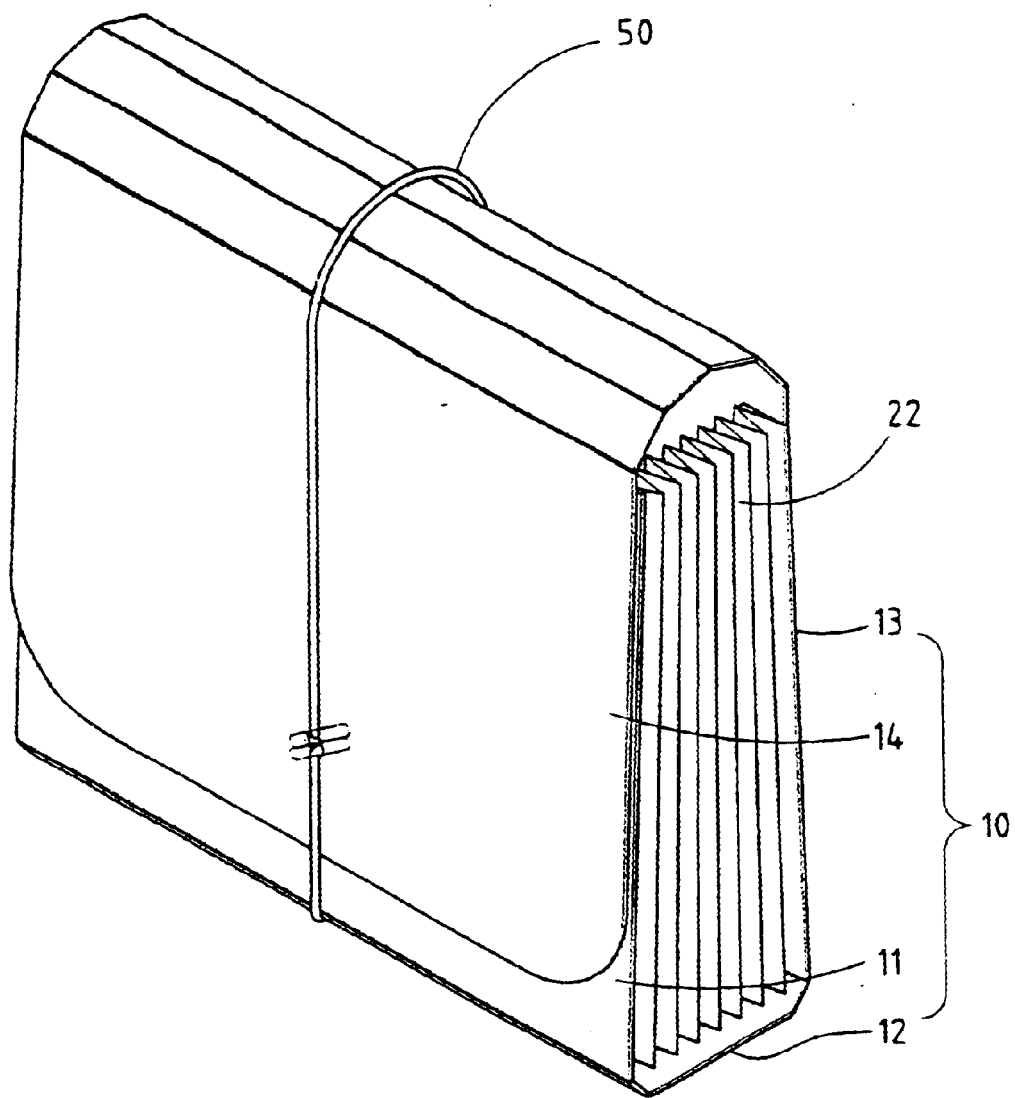
FIG. 2 shows a perspective view of the first preferred embodiment of the present invention with the flap being in the closed state.
Figure 3:
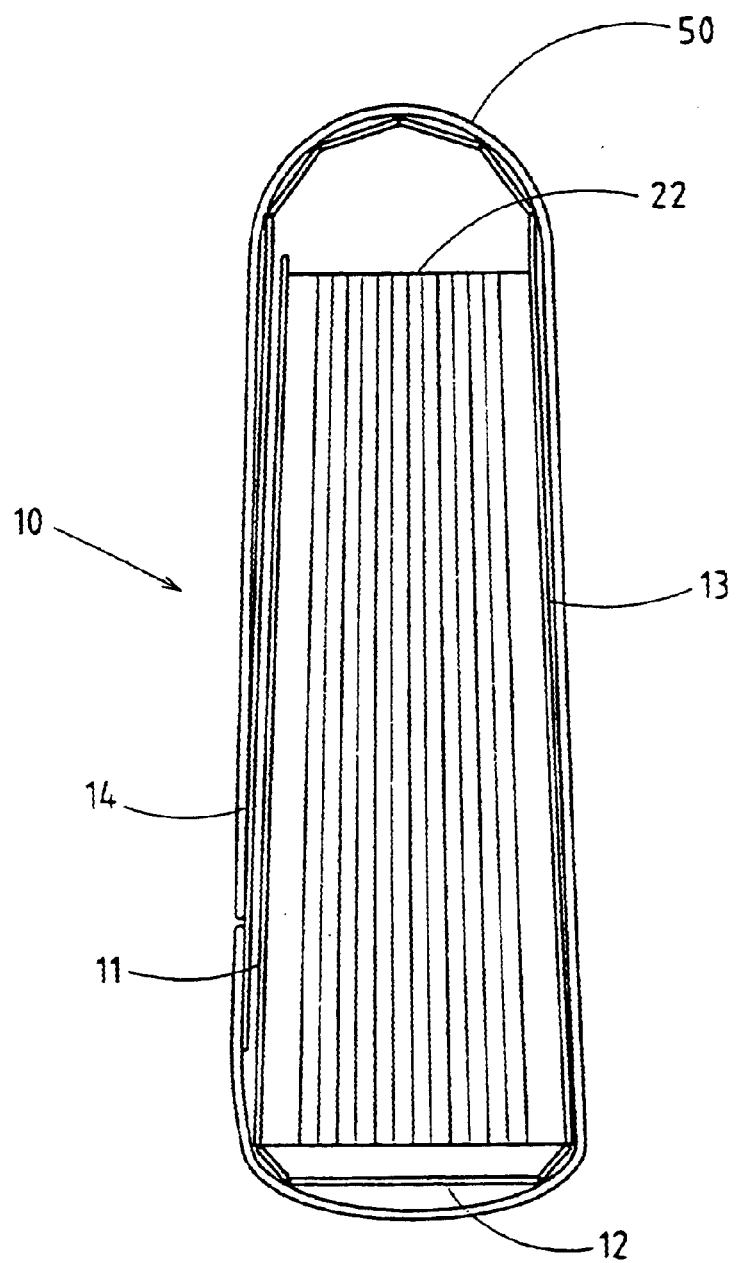
FIG. 3 shows a side plan view of the first preferred embodiment of the present invention with the flap remaining in the closed state.
Figure 4:
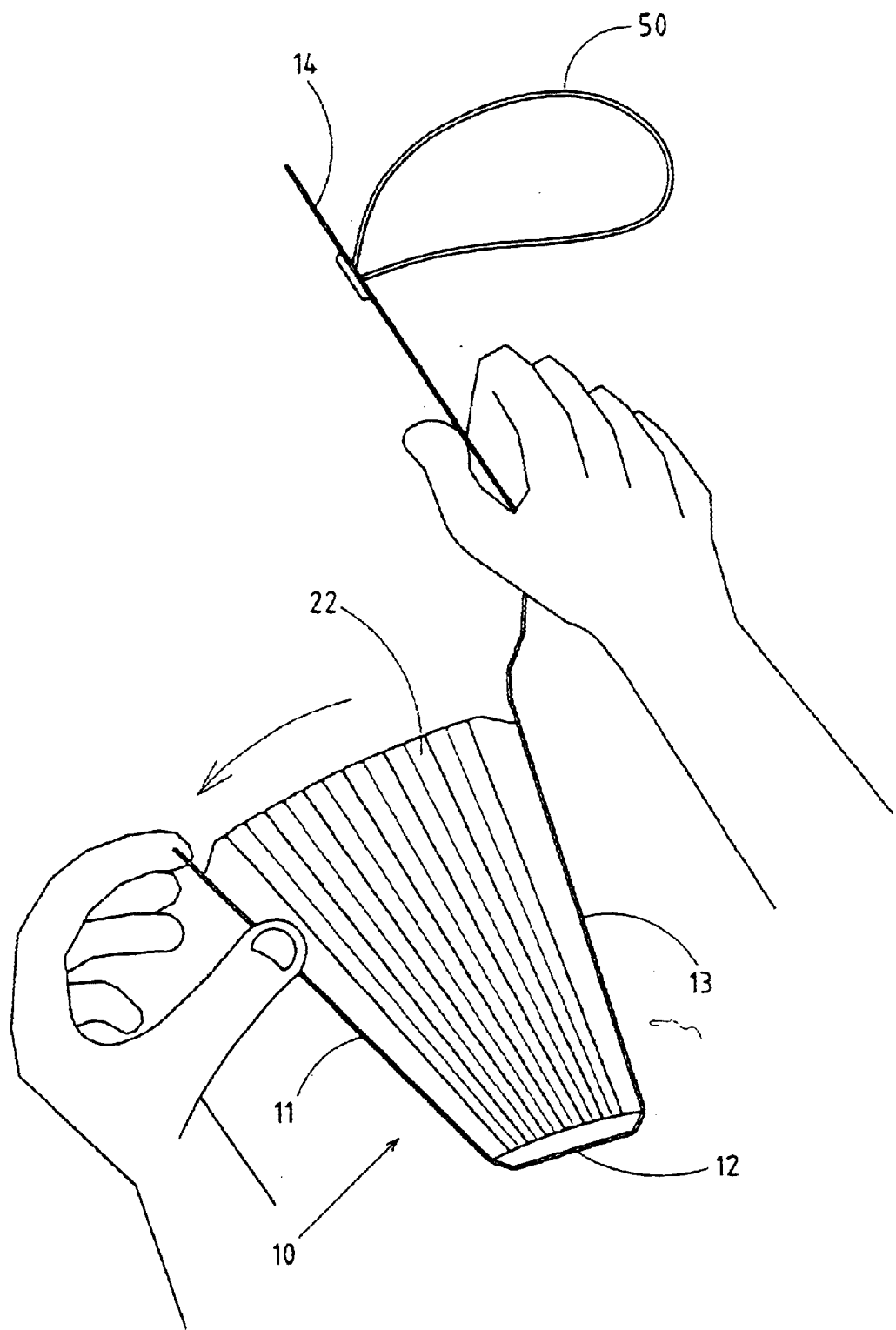
FIG. 4 shows a side schematic view of the first preferred embodiment of the present invention with the flap being opened.

As shown in FIGS. 1–7, a compact disc container embodied in the present invention is made of a shell body 10 which is in turn made of a flexible material. The shell body 10 has a front side 11, a bottom side 12, a rear side 13, a flap 14 extending from the rear side 13, a hollow interior 15 defined by the front side 11, the rear side 13 and two pleated sides 21 and 22 which are fastened between the front side 11 and the rear side 13.

The hollow interior 15 is provided with a plurality of disc pockets 30, which are fastened at two sides thereof with the two pleated sides 21 and 22 and are provided with a slot 31 and an opening 32 through which a compact disc 40 is put into the slot 31.

Figure 5:
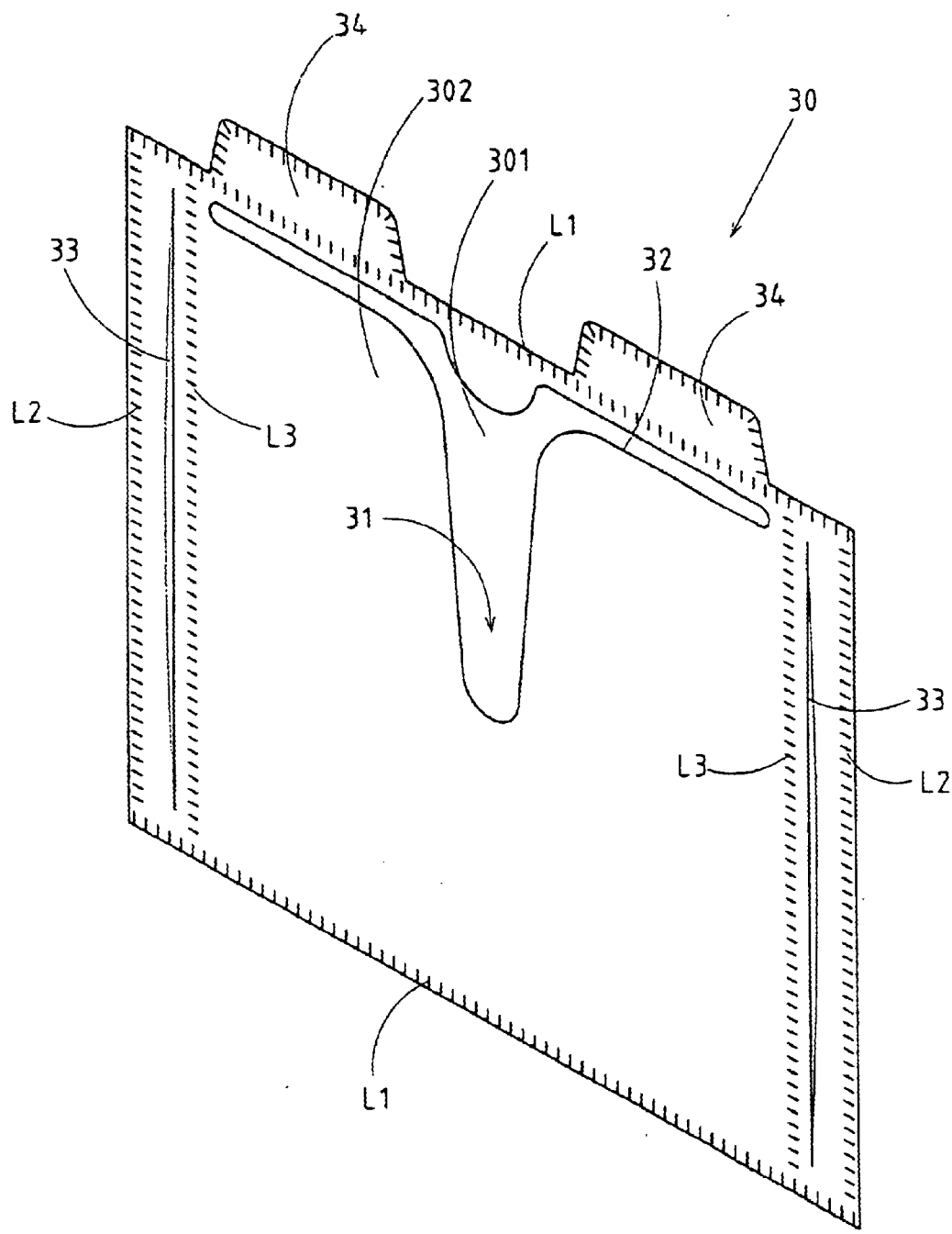
FIG. 5 shows a perspective view of the disc-holding pocket of the first preferred embodiment of the present invention.
Figure 6:
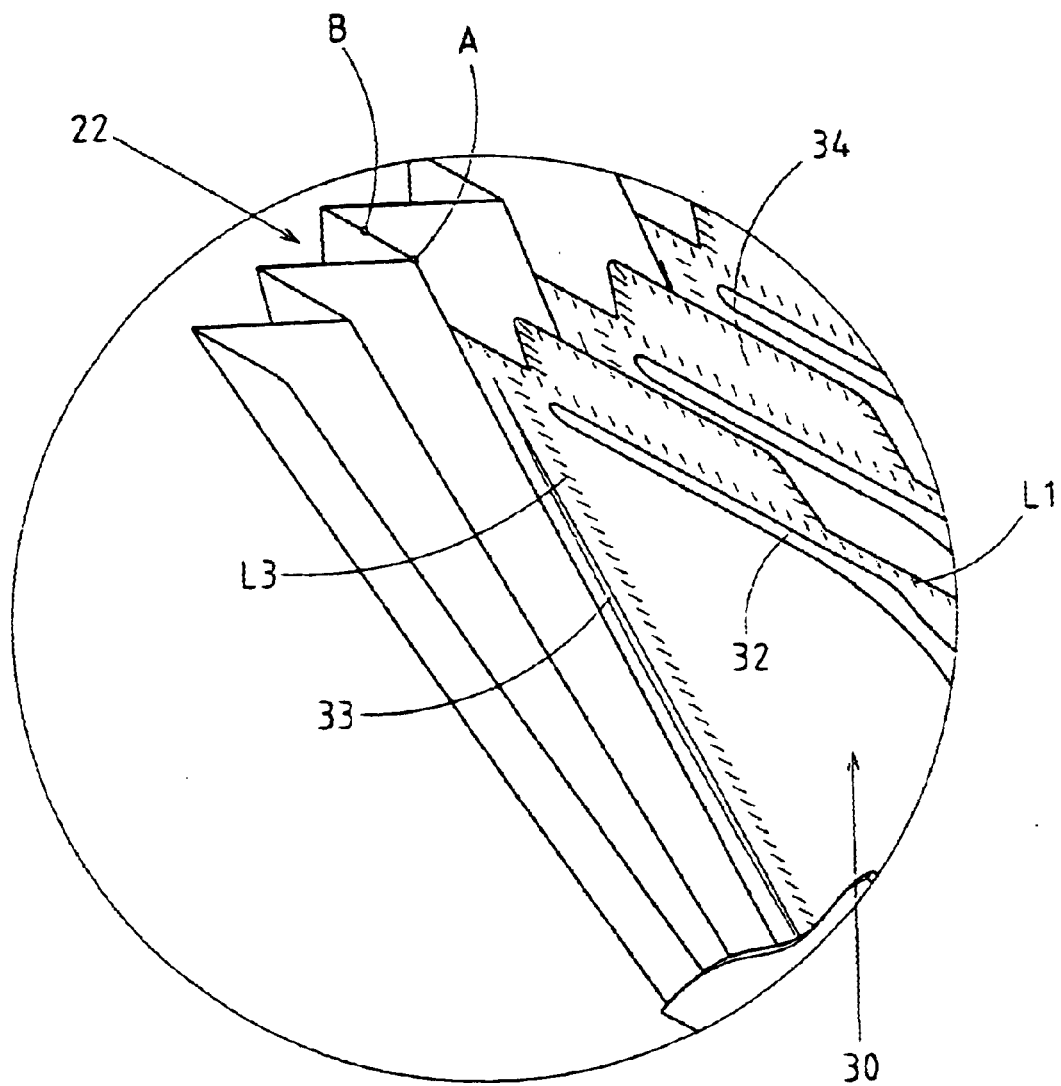
FIG. 6 shows a structural relationship between the disc pockets and the accordion pleats of the first preferred embodiment of the present invention.
Figure 7:
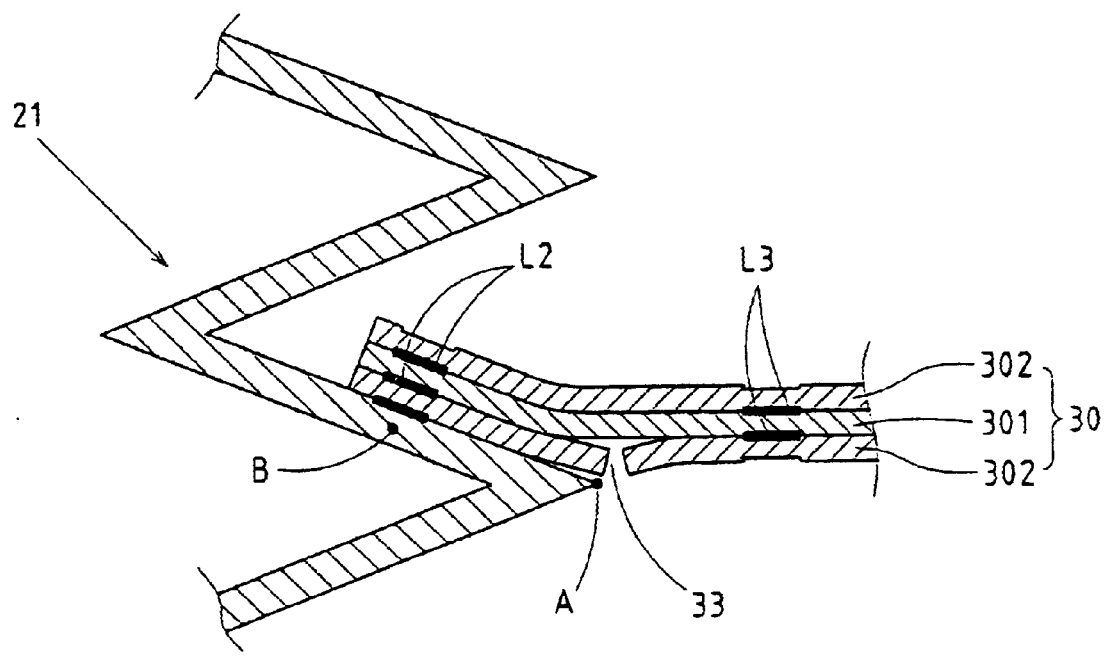
FIG. 7 shows a cross-sectional view of the present invention as shown in FIG. 6.
Figure 8:
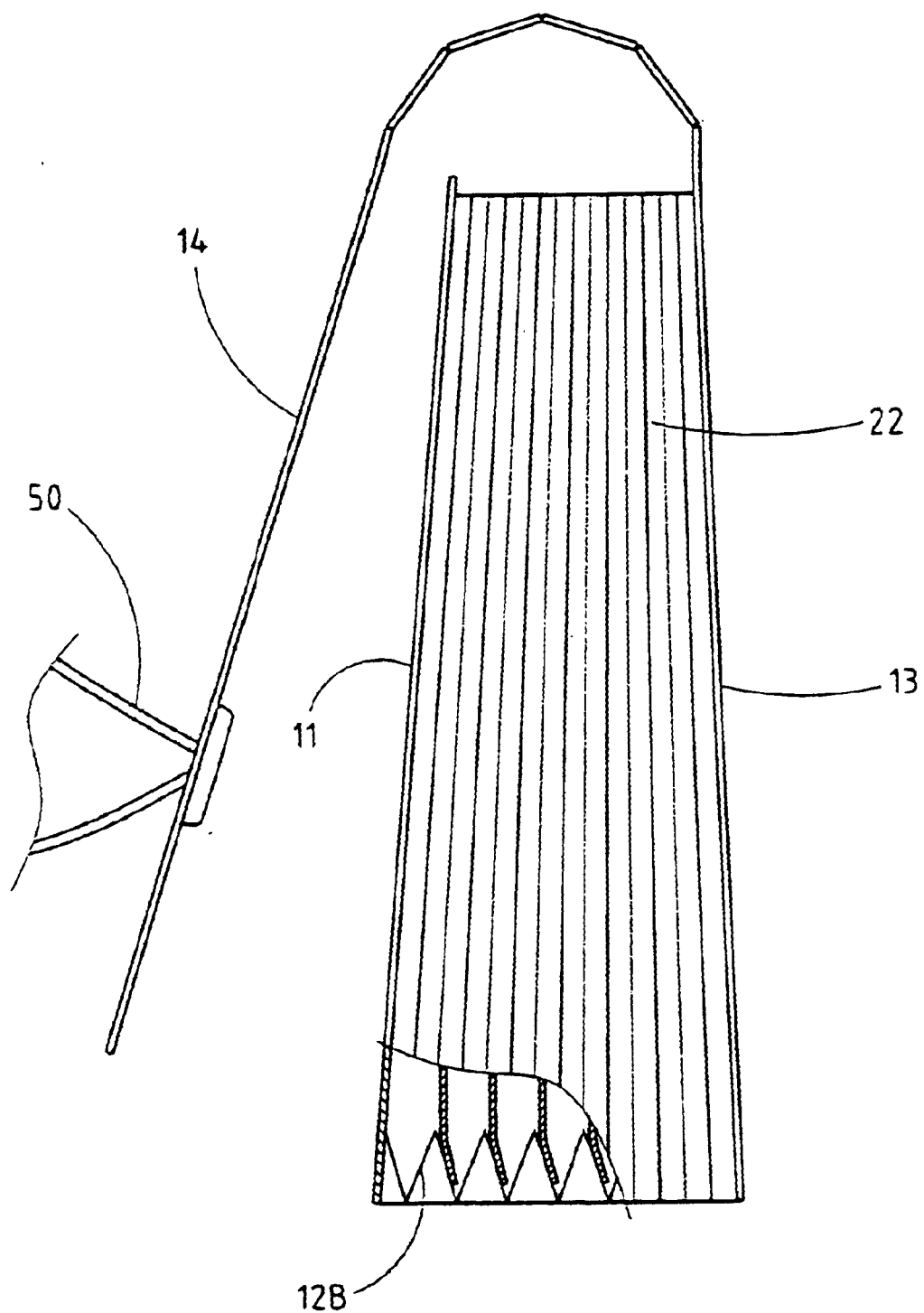
FIG. 8 shows a side schematic plan view of a second preferred embodiment of the present invention.
Figure 9:
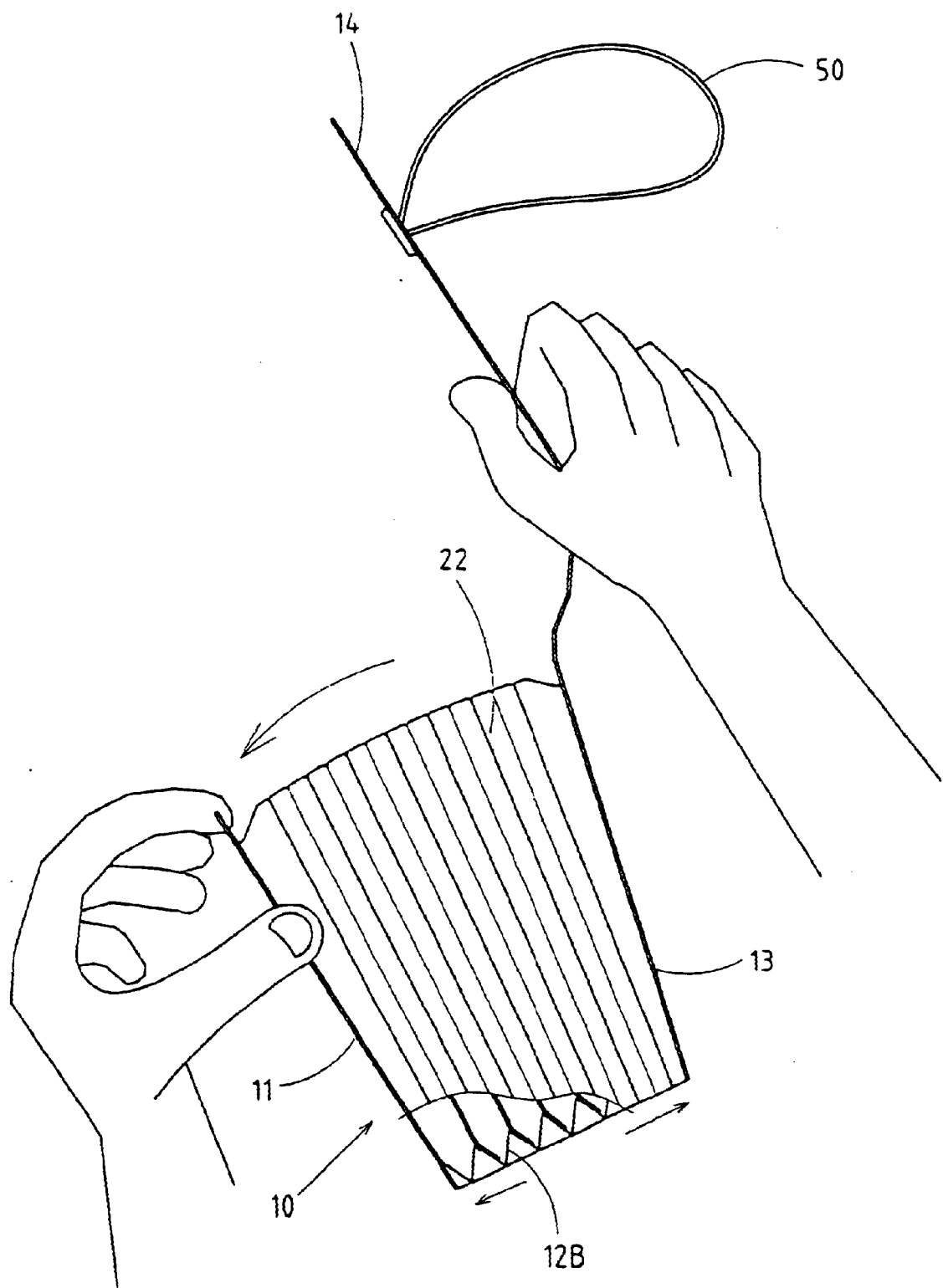
FIG. 9 shows a side schematic view of the second preferred embodiment of the present invention with a flap being opened up.
Figure 10:
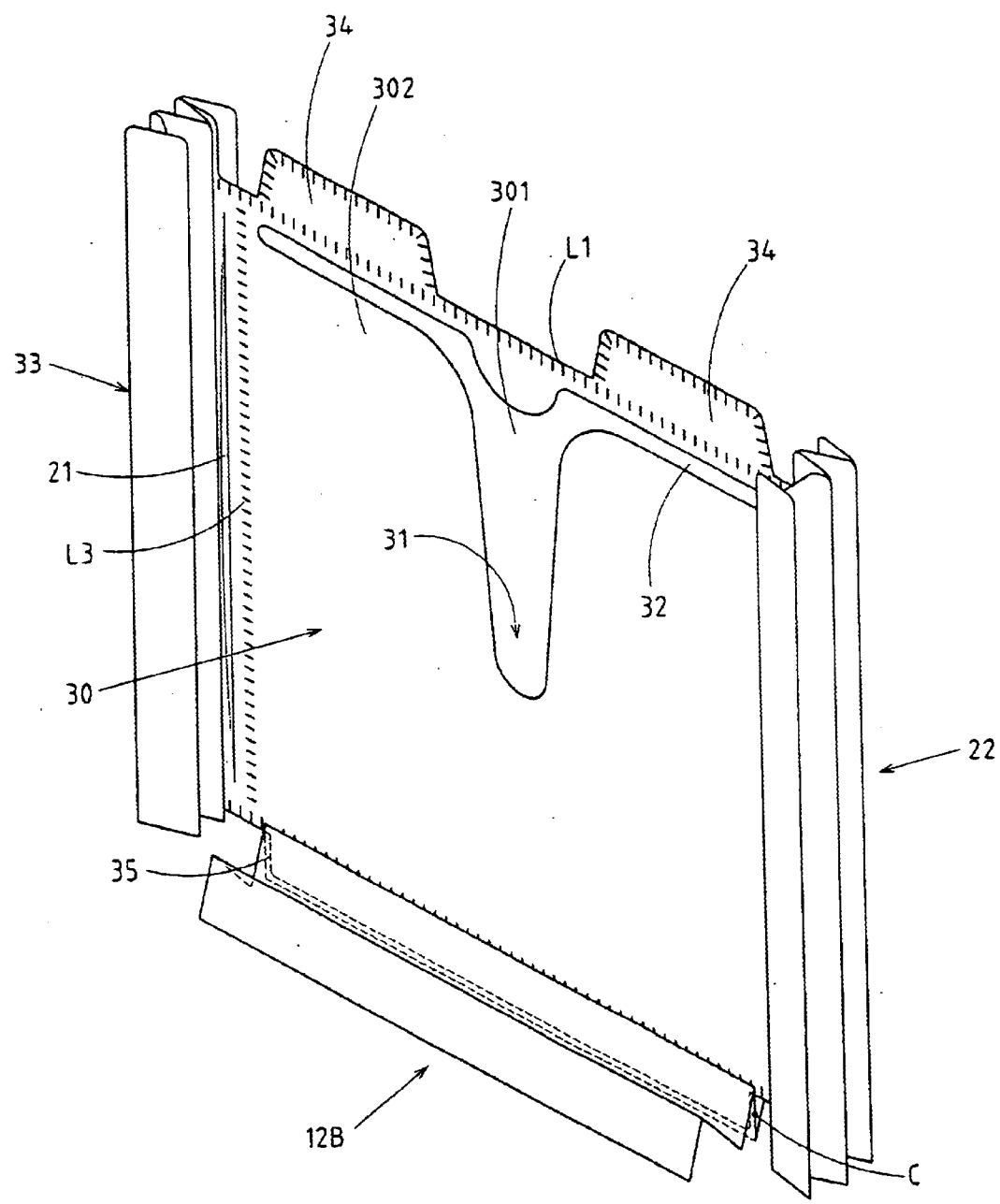
FIG. 10 shows a perspective view of a disc pocket structure of the second preferred embodiment of the present invention.

The disc pockets 30 are formed of a middle layer 301 of a non-woven cloth and two outer layers 302 of aplastic film. The middle layer 301 and the outer layers 302 are joined at the adjoining top edges and the adjoining bottom edges by a fusion line L1, which is attained by a high frequency wave. The middle layer 301 and the outer layers 302 are joined at the adjoining left edges and right edges by two fusion lines L2 and L3, which are parallel to each other and are separated from each other by a distance. Located between the two fusion lines L2 and L3 is a slit 33 which is made in the plastic film layer 302, as shown in FIGS. 5 and 7, such that the slit 33 is corresponding in location to the tips of the accordion pleats 21 or 22. The portion of the plastic film layer 302, which is located between the slit 33 and the outer fusion line L2, is fused with the face of the accordion pleats 21 or 22, as illustrated in FIG. 7.

The middle layer 301 and the outer layers 302 are jointly provided at the adjoining top edges with one or more projecting pieces serving as file tabs 34 of the disc pockets 30.

The flap 14 is extended from the top edge of the rear side 13 for covering the open top of the shell body 10. The flap 14 is provided with an elastic cord 50 for use in keeping the flap 14 in the closed state.

Figure 11:
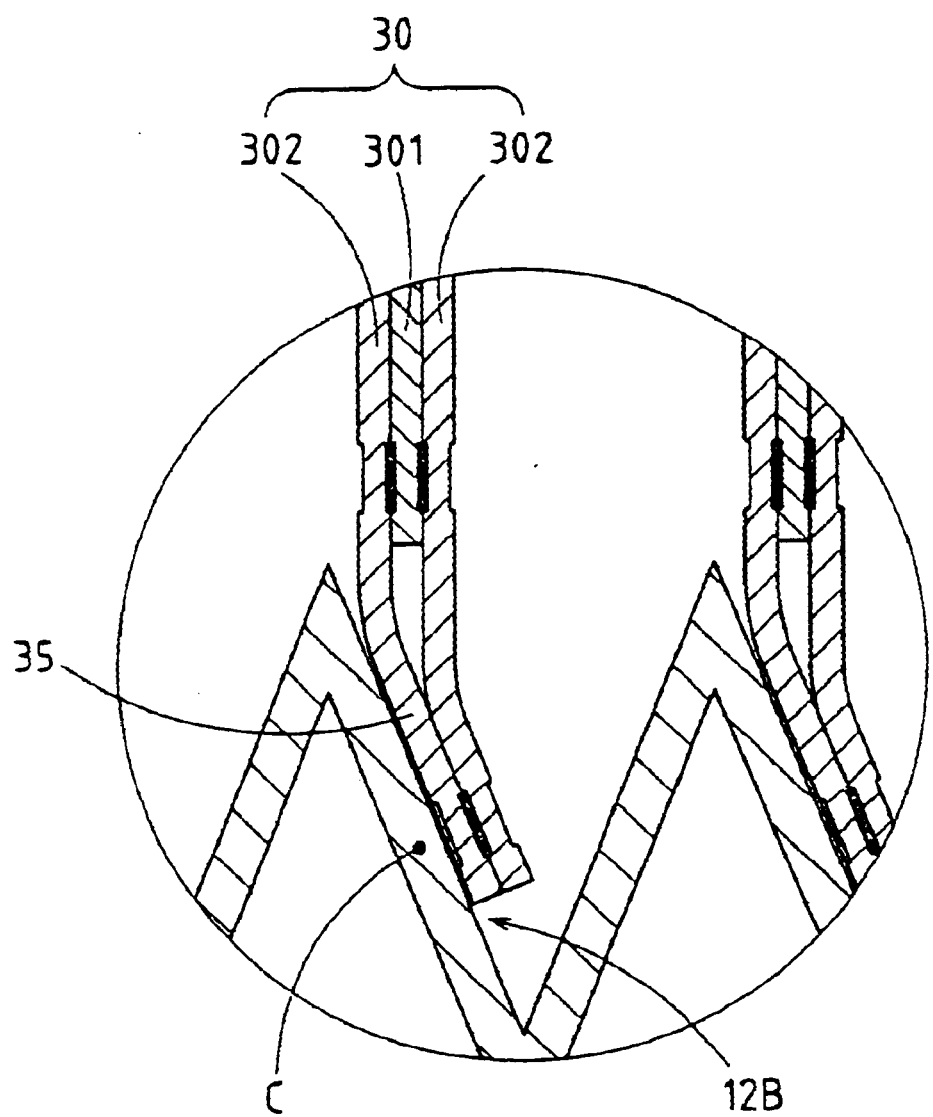
FIG. 11 shows a partial sectional view of the second preferred embodiment of the present invention.
Figure 12:
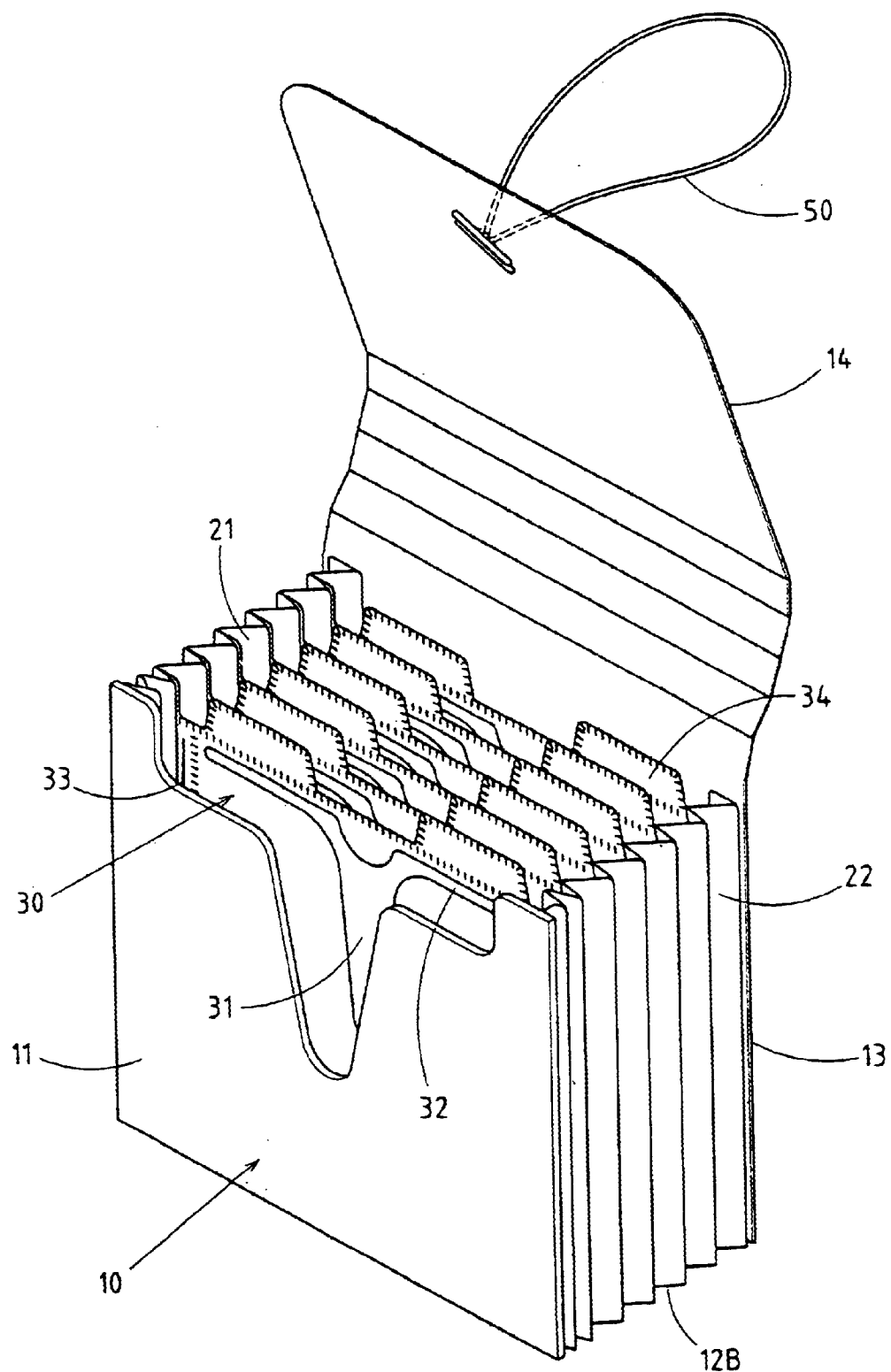
FIG. 12 shows a perspective view of the second preferred embodiment of the present invention.

As shown in FIGS. 8–12, a bottom side 12A of the shell body 10 is pleated and fastened with the bottom edges of the front side 11 and the rear side 13 by high frequency wave. In light of accordion pleats of the bottom side 12A, the bottom side 12A is capable of folding like the bellows of an accordion. The bottom side 12A is further provided with a projecting edge 35, which is fastened with the face of the pleats of the bottom side 12B, as shown in FIG. 11. As a result, the bottom side 12B of he shell body 10 can be so expanded as to enable the shell body 10 to rest securely on a surface, as illustrated in FIG. 12.

It is therefore readily apparent that the compact disc container of the present invention can be compressed or expanded, depending on the number of the compact disks which are kept in the container. It is readily conceivable that the expandable container of the present invention makes it easy for a user to look for a specific compact disc kept in the container, or to put the compact disc back into the container.

The slit 33 located between the outer fusion line L2 and the inner fusion line L3 is intended to separate the fastening portion of the plastic film layer 302 and the pleated sides 21 or 22 from the center portion of the plastic film layer 302, thereby making the disc pockets 30 pliable and preventing the center portion of the plastic film layer 302 from wrinkling.

The embodiments of the present invention described above are to be regarded in all respects as being illustrative and nonrestrictive. Accordingly, the present invention may be embodied in other specific forms without deviating from the spirit thereof. The present invention is therefore to be limited only by the scopes of the following claims.

I claim:

1. A compact disc container comprising:

a shell body comprised of a front side, a rear side, a bottom side, a left side, a right side, and a hollow interior defined by said front side, said rear side, said bottom side, said left side, and said right side such that said hollow interior has an open top; and a plurality of disc pockets disposed in said hollow interior of said shell body such that a left side of said disc pockets is joined with said left side of said shell body, and such that a right side of said disc pockets is joined with said right side of said shell body whereby said disc pockets are comprised of a disc slot, and an opening through which a disc is inserted into said disc slot;

wherein said left side and said right side of said shell body are comprised of accordion pleats, each pleat having a tip and two faces;

wherein said disc pockets comprised of a non-woven middle layer and two plastic film outer layers, which are joined at adjoining top edges and adjoining bottom edges by a fusion line, said middle layer and said two outer layers being joined at adjoining left edges and adjoining right edges by an outer fusion line and an inner fusion line whereby one of said two outer layers is comprised of a slit located between said outer fusion line and said inner fusion line, said disc pockets being fasten to said left side and said right side of said shell body in such a way that said slit is corresponding in location to the tip of the pleats of said left side or right side of said shell body, and such that said outer fusion line is fused with one of the two faces of the pleats of said let side or right side of said shell body.

2. A compact disc container as defined in claim 1, wherein middle layer and said outer layers of said disc pockets are jointly provided at adjoining top edges with at least one file tab.

3. A compact disc container as defined in claim 1, wherein said bottom side of said shell body is comprised of accordion pleats.

4. A compact disc container as defined in claim 1, further comprising a flap extending from a top edge of said rear side of said shell body for covering the open top of said hollow interior of said shell body.

* * * * *